United States Patent
Wu et al.

(10) Patent No.: US 11,927,664 B2
(45) Date of Patent: Mar. 12, 2024

(54) RADAR-BASED DETECTION USING ANGLE OF ARRIVAL ESTIMATION BASED ON SPARSE ARRAY PROCESSING

(71) Applicant: NXP B.V., Eindhoven (NL)

(72) Inventors: Ryan Haoyun Wu, San Jose, CA (US); Jun Li, Brooklyn, NY (US); Maik Brett, Taufkirchen (DE); Michael Andreas Staudenmaier, Munich (DE)

(73) Assignee: NXP B.V., Eindhoven (NL)

( * ) Notice: Subject to any disclaimer, the term of this patent is extended or adjusted under 35 U.S.C. 154(b) by 579 days.

(21) Appl. No.: 17/185,115

(22) Filed: Feb. 25, 2021

(65) Prior Publication Data

US 2022/0268911 A1 Aug. 25, 2022

(51) Int. Cl.
*G01S 13/04* (2006.01)
*G01S 7/41* (2006.01)
*G01S 13/02* (2006.01)

(52) U.S. Cl.
CPC .............. *G01S 13/04* (2013.01); *G01S 7/41* (2013.01); *G01S 2013/0245* (2013.01)

(58) Field of Classification Search
CPC .......... G01S 3/14; G01S 13/931; G01S 7/354; G01S 2013/0254; G01S 7/356; G01S 2013/0245; G01S 7/2883; G01S 3/74; G01S 13/02; G01S 13/34; G01S 13/42; G01S 7/352; G06F 17/16; H01Q 21/00; H01Q 21/061; H04B 7/086
See application file for complete search history.

(56) References Cited

U.S. PATENT DOCUMENTS

| 4,845,500 A | 7/1989 | Cornett et al. |
| 6,560,445 B1 | 5/2003 | Fette et al. |

(Continued)

FOREIGN PATENT DOCUMENTS

| CN | 105652273 A | 6/2016 | |
| CN | 106019213 A * | 10/2016 | ............... G01S 3/14 |

(Continued)

OTHER PUBLICATIONS

D. Xu, G. Zhang and Z. Peng, "Optimization design of CS-MIMO radar sparse random array," 2016 CIE International Conference on Radar (RADAR), Guangzhou, China, 2016, pp. 1-4 (Year: 2016).*

(Continued)

*Primary Examiner* — Olumide Ajibade Akonai

(57) ABSTRACT

In one example, a radar circuit uses computer processing circuitry for processing data corresponding to reflection signals via a sparse array. Output data indicative of signal magnitude associated with the reflection signals is generated, and then angle-of-arrival information is discerned therefrom by (e.g., iteratively): correlating the output data with at least one spatial frequency support vector indicative of a correlation peak for the output data; generating upperside and lower-side support vectors which are neighbors along the spatial frequency spectrum for said at least one spatial frequency support vector, and providing, via a correlation of the upper-side and lower-side support vectors and said at least one spatial frequency support vector, at least one new vector that is more refined along the spatial frequency spectrum for said at least one spatial frequency support vector.

19 Claims, 10 Drawing Sheets

(56) References Cited

U.S. PATENT DOCUMENTS

| | | | |
|---|---|---|---|
| 8,344,944 | B2 | 1/2013 | Goodman |
| 8,380,770 | B1 | 2/2013 | Nuthalapati |
| 9,157,992 | B2 | 10/2015 | Wang et al. |
| 9,223,015 | B2 | 12/2015 | Kojima |
| 9,271,185 | B2 | 2/2016 | Abdelmonem et al. |
| 9,576,468 | B2 | 2/2017 | Zack et al. |
| 9,628,122 | B1 | 4/2017 | Clark et al. |
| 9,806,747 | B1 | 10/2017 | Clark et al. |
| 9,870,641 | B2 | 1/2018 | Anderson et al. |
| 9,952,720 | B2 | 4/2018 | Schwartz et al. |
| 10,067,221 | B2 | 9/2018 | Ginsburg et al. |
| 10,704,970 | B1 | 7/2020 | Brown et al. |
| 10,879,946 | B1 | 12/2020 | Shima |
| 11,002,837 | B2 | 5/2021 | Barber et al. |
| 11,313,943 | B2 | 4/2022 | Moss et al. |
| 11,394,475 | B1 | 7/2022 | Vaca et al. |
| 11,448,752 | B2 | 9/2022 | Wennersten et al. |
| 11,567,183 | B2 | 1/2023 | Wang et al. |
| 11,644,565 | B2 * | 5/2023 | Li ................ G01S 13/872 342/43 |
| 11,681,011 | B2 | 6/2023 | Meissner et al. |
| 2009/0009661 | A1 | 1/2009 | Murakami et al. |
| 2012/0026031 | A1 | 2/2012 | Goodman |
| 2013/0201054 | A1 | 8/2013 | Wang et al. |
| 2013/0342383 | A1 | 12/2013 | Kojima |
| 2014/0182361 | A1 | 7/2014 | Bargatin et al. |
| 2014/0274094 | A1 | 9/2014 | Abdelmonem et al. |
| 2015/0198713 | A1 | 7/2015 | Boufounos et al. |
| 2015/0279082 | A1 | 10/2015 | Anderson et al. |
| 2016/0291130 | A1 | 10/2016 | Ginsburg et al. |
| 2016/0379475 | A1 | 12/2016 | Zack et al. |
| 2017/0010344 | A1 | 2/2017 | Corbett |
| 2017/0149147 | A1 | 5/2017 | Minami et al. |
| 2018/0106889 | A1 | 4/2018 | Schuck et al. |
| 2019/0011533 | A1 | 1/2019 | Ginsburg et al. |
| 2020/0161775 | A1 | 5/2020 | Zhu et al. |
| 2020/0200861 | A1 | 6/2020 | Alawsh et al. |
| 2020/0321710 | A1 | 10/2020 | Shtrom et al. |
| 2021/0018604 | A1 | 1/2021 | Barber et al. |
| 2021/0318424 | A1 | 10/2021 | Wang et al. |
| 2021/0373144 | A1 * | 12/2021 | Amani ................ G01S 13/34 |

FOREIGN PATENT DOCUMENTS

| | | | | |
|---|---|---|---|---|
| CN | 106054123 | A * | 10/2016 | ............... G01S 3/14 |
| CN | 104749553 | B | 3/2017 | |
| CN | 105182293 | B | 7/2017 | |
| CN | 109061556 | A | 12/2018 | |
| CN | 111580039 | A | 8/2020 | |
| CN | 111610512 | A | 9/2020 | |
| EP | 3 588 128 | A1 | 6/2018 | |
| EP | 3 712 654 | A1 | 9/2020 | |
| GB | 2565824 | A | 2/2019 | |
| JP | 2020106397 | | 7/2020 | |
| WO | 2019106656 | A1 | 6/2019 | |

OTHER PUBLICATIONS

F. Athley, C. Engdahl and P. Sunnergren, "Model-based detection and direction of arrival estimation in radar using sparse arrays," Conference Record of the Thirty-Eighth Asilomar Conference on Signals, Systems and Computers, 2004., Pacific Grove, CA, USA, 2004, pp. 1953-1957 vol. 2 (Year: 2004).*

J. Bechter and C. Waldschmidt. "Automotive Radar Interference Mitigation by Reconstruction and Cancellation of Interference Component," 2015 IEEE MTT-S International Conference on Microwaves for Intelligent Mobility, 4 pgs, Apr. 27-29, 2015.

J. Bechter et al. "Automotive Radar Interference Mitigation using a Sparse Sampling Approach," Proceedings of the 14th European Radar Conference, Nuremberg, Germany, pp. 90-94, Oct. 11-13, 2017.

U.S. Appl. No. 17/245,613, filed Apr. 30, 2021, entitled "Radar Communication With Interference Suppression".

Chen, Zhimin et al; "A Robust Sparse Bayesian Learning-Based DOA Estimation Method With Phase Calibration"; IEEE Access, IEEE, USA, vol. 8; pp. 141511-0141522 (Jul. 31, 2020).

Huang, Qinghua et al; "Real-Valued DOA Estimation for Sperical Arrays Using Sparse Bayesian Learning"; Elsevier, Signal Processing, 125; 8 pages (Jan. 26, 2016).

Mishra, Amrita et al.; "Sparse Bayesian Learning-Based Target Imaging and Parameter Estimation for Monostatic MIMO Radar Systems"; IEEE Access vol. 6; pp. 68545-68559, vol. 6; (Nov. 9, 2018).

Moghadam, Goudarz Saadati et al; "Novel Method for Digital Beamforming in Co-prime Sensor Arrays Using Product and Min Processors"; IET Journals, IET Signal Processing; 10 pages (Jun. 24, 2019).

Lei, Sun et al; "Direction-of-Arrival Estimation Based on Modified Bayesian Compressive Sensing Method"; IEEE 4 pages (2011).

Final Office Action: U.S. Appl. No. 17/245,613; 17 pages (dated Aug. 2, 2023).

Notice of Allowance; U.S. Appl. No. 17/185,040; 14 pages (dated Aug. 7, 2023).

Non Final Office Action: U.S. Appl. No. 17/185,040; 40 pages (dated Apr. 6, 2023).

Non Final Office Action: U.S. Appl. No. 17/245,613; 33 pages (dated Apr. 5, 2023).

Wang, Jianping; "CFAR-Based Interference Mitigation for FMCW Automotive Radar Systems"; Arixiv.org, Cornell University Library, Ithaca, NY; 10 pages (Jan. 4, 2021).

Non Final Office Action: U.S. Appl. No. 17/185,162; 12 pages (dated Dec. 14, 2022).

Y.D. Zhang, M. G. Amin and B. Himed, "Sparsity-based DOA Estimation Using Co-prime Arrays", 2013 IEEE International Conference on Acoustics, Speech and Signal Processing, Vancouver, BC, 2013, pp. 3967-3971.

Karabulut, G., Kurt, T. & Yongacoglu, A. "Estimation of Direction of Arrival by Matching Pursuit (EDAMP)". J Wireless Com Network 2005, 197-205.

P. Gerstoft, C.F. Mecklenbrauker, A. Xenaki and S. Nannuru, "Multisnapshot Sparse Bayesian Learning for DOA," in IEEE Signal Processing Letter, vol. 23, No. 10, Oct. 2016, pp. 1469-1473.

M. D. Sacchi, T. J. Ulrych and C. J. Walker, "Interpolation and extrapolation using a high-resolution discrete Fourier transform," in IEEE Transactions on Signal Processing, vol. 46, No. 1, Jan. 1998, pp. 31-38.

Applicant respectfully refers the Examiner to concurrently-filed U.S. patent applications of the common Applicant/Assignee, U.S. Appl. Nos. 17/185,084, 17/185,084, and U.S. Appl. No. 17/185,162, each filed Feb. 25, 2021. No Attachment.

Non Final Office Action: U.S. Appl. No. 17/245,613; 18 pages (dated Nov. 6, 2023).

* cited by examiner

RADAR-BASED DETECTION USING ANGLE OF ARRIVAL ESTIMATION BASED ON SPARSE ARRAY PROCESSING

OVERVIEW

Aspects of various embodiments are directed to radar apparatuses/systems and related methods.

In certain radar signaling applications including but not limited to automotive and autonomous vehicle applications, high spatial resolution may be desirable for detecting and distinguishing objects which are perceived as being located at the similar distances and/or moving at similar velocities. For instance, it may be useful to discern directional characteristics of radar reflections from two or more objects that are closely spaced, to accurately identify information such as location and velocity of the objects.

Virtual antenna arrays have been used to mitigate ambiguity issues with regards to apparent replicas in discerned reflections as indicated, for example, by the amplitudes of corresponding signals as perceived in the spatial resolution spectrum (e.g., amplitudes of main lobes or "grating lobes"). But even with many advancements in configurations and algorithms involving virtual antenna array, radar-based detection systems continue to be susceptible to ambiguities and in many instances yield less-than optimal or desirable spatial resolution. Among these advancements, virtual antenna arrays have been used with multiple-input multiple-output (MIMO) antennas to achieve a higher spatial resolution, but such approaches can be challenging to implement successfully, particularly in rapidly-changing environments such as those involving automobiles travelling at relatively high speeds.

These and other matters have presented challenges to efficiencies of radar implementations, for a variety of applications.

SUMMARY

Various example embodiments are directed to issues such as those addressed above and/or others which may become apparent from the following disclosure concerning radar devices and systems in which objects are detected by sensing and processing reflections or radar signals for discerning location information and related information including as examples, distance, angle-of-arrival and/or speed information.

In one specific example, aspects of the present disclosure are directed to a method of using an apparatus (e.g., device, circuit and/or system) which includes a radar circuit and computer processing circuitry. The method includes receiving, in response to transmitted radar signals, reflection signals as reflections from objects. Via the computer processing circuitry, the reflection signals are processed via a multi-input multi-output virtual array having at least one embedded uniform sparse linear array, and in response, output data is generated to indicate signal magnitude information associated with the reflection signals. Next, the computer processing circuitry discerns angle-of-arrival information for the output data by: correlating the output data with at least one spatial frequency support vector indicative of a correlation peak for the output data; generating upper-side and lower-side support vectors which are neighbors along the spatial frequency spectrum for said at least one spatial frequency support vector; and providing, via a correlation of the upper-side and lower-side support vectors and said at least one spatial frequency support vector, at least one new vector that is more refined along the spatial frequency spectrum for said at least one spatial frequency support vector. In specific embodiments, these last steps may be performed repeatedly or iteratively for further levels of refinement.

In certain other example embodiments, aspects of the present disclosure are directed to a radar circuit or system in which antenna elements and front-end transceiver circuitry are used to transmit radar signals and, in response, to receive reflection signals from objects. The circuit or system includes logic circuitry including a first module, a second module and a memory circuit for hosting a sparse array (e.g., a multi-input multi-output (MIMO) virtual array or other type) having at least one embedded uniform sparse linear array. The first module is to process data corresponding to the reflection signals via the array and, in response, to generate output data indicative of signal magnitude associated with the reflection signals, and the second module is to discern angle-of-arrival information for the output data by: correlating the output data with at least one spatial frequency support vector indicative of a correlation peak for the output data, generating upper-side and lower-side support vectors which are neighbors along the spatial frequency spectrum for said at least one spatial frequency support vector, providing, via correlation of the upper-side and lower-side support vectors and said at least one spatial frequency support vector, at least one new vector that is more refined along the spatial frequency spectrum for said at least one spatial frequency support vector, and refining the at least one new vector by performing one or more of said steps of correlating, generating and providing in an iteratively manner.

In one or more of the above-described aspects and methodology, aspects or steps therein may be implemented more specifically. The following are examples of aspects or steps which may be used separately or together in various combinations: the multi-input multi-output virtual array has at least one embedded uniform sparse linear arrays being associated with a unique antenna-element spacing and the steps are carried out iteratively to provide refinement of previously identified support vectors, associated with each said at least one new vector, for reduction of quantization error and to keep coherence low; the array may have at least two embedded uniform sparse linear arrays; the array may have at least two embedded uniform sparse linear arrays, each of which is being associated with a unique antenna-element spacing from among a set of unique co-prime antenna-element spacings.

Further, the first module and/or the second module may impose sparsity constraints on the output data for mitigation of ambiguities due to spurious sidelobes, and the second module may perform a greedy algorithm such as a matching pursuit method for estimating the correlation peak for the output data in the spatial frequency spectrum. While various examples discuss MIMO-type sparse arrays, a variety of different types of sparse arrays (including those which are not configured as MIMO type) work in various examples with such aspects of the second module.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 5A and 5B are respectively yet another set of plots showing effective antenna spacings and a related graph of normalized spatial frequency, in accordance with the present disclosure; and.

Figure 1A:
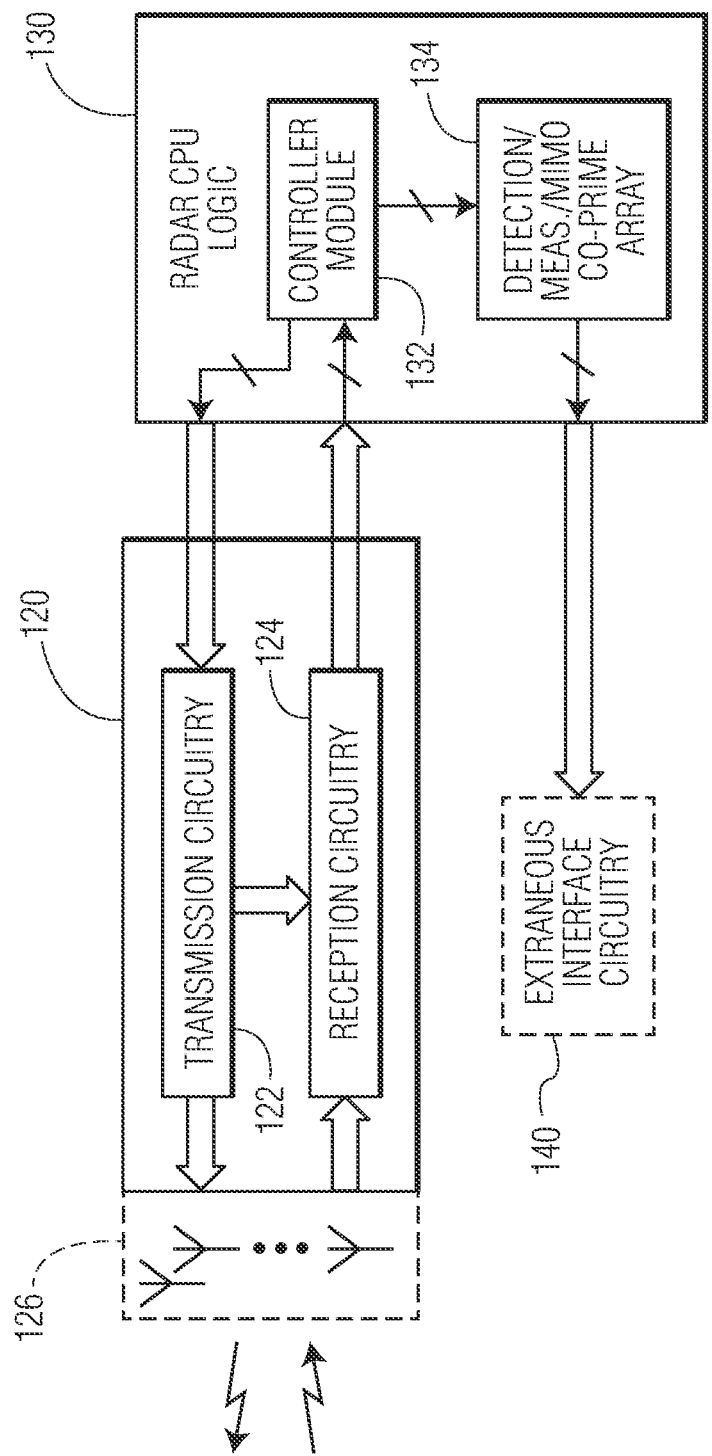
FIG. 1A is a system-level diagram of a radar-based object detection circuit, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar systems and related communications. In certain implementations, aspects of the present disclosure have been shown to be beneficial when used in the context of automotive radar in environments susceptible to the presence of multiple objects within a relatively small region. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In a particular embodiment, a radar-based system or radar-detection circuit may include a radar circuit front-end with signal transmission circuitry to transmit radar signals and with signal reception circuitry to receive, in response, reflection signals as reflections from objects which may be targeted by the radar-detection circuit or system. The radar-detection circuit or system may also include logic and/or control-timing circuitry which in communication with the signal transmission circuitry and the signal reception circuitry, and a sparse array (as exemplified by but not limited to a multi-input multi-output (MIMO) type array) which may be used to enhance resolution and/or remove ambiguities otherwise present in processed signals associated with the reflections. The array may have one or multiple embedded uniform sparse linear arrays. From the array, output data is presented as measurement vectors, indicative of signal magnitudes associated with the reflection signals, to another module for discerning angle-of-arrival (AoA) information.

The logic or computer processing circuitry associated with this AoA module determines or estimates the AoA information by correlating the output data with at least one spatial frequency support vector indicative of a correlation peak for the output data, generating upper-side and lower-side support vectors which are neighbors along the spatial frequency spectrum for said at least one spatial frequency support vector, and providing, via a correlation of the upper-side and lower-side support vectors and said at least one spatial frequency support vector, at least one new vector that is more refined along the spatial frequency spectrum for said at least one spatial frequency support vector.

Certain more particular aspects of the present disclosure are directed to such use and/or design of the AoA module in response to such output data from a multi-input multi-output (MIMO) array which, as will become apparent, may be implemented in any of a variety of different manners, depending on the design goals and applications. Accordingly given that the data flow and related processing operations in such devices and systems is perceived as being performed in connection with the MIMO array first, in the following discussion certain optional designs of the MIMO array are first addressed and then the discussion herein shifts to such particular aspects involving use and/or design of the AoA module.

Among various exemplary designs consistent with the present disclosure, one specific design for the sparse array has it arranged to include a plurality of embedded sparse linear arrays, with each such array being associated with a unique antenna-element spacing from among a set of unique co-prime antenna-element spacings. As will become apparent, such co-prime spacings refer to numeric value assignments of spacings between antenna elements, wherein two such values are coprime (or co-prime) if the only positive integer (factor) that divides both of them is 1; therefore, the values are coprime is any prime number that divides one does not divide the other. As a method in use, such a radar-based circuit or system transmits radar signals and, in response, receives reflection signals as reflections from targeted objects which may be in a particular field of view. The virtual array provides processing of data corresponding to the reflections by using at least two embedded sparse linear arrays in the sparse array, each being associated with one such unique antenna-element spacing. In other designs for the sparse array, there are either embedded uniform sparse linear array and/or multiple, each being associated with a unique antenna-element spacing which may or may not be necessarily selected from among set of unique co-prime antenna-element spacings.

These unique co-prime antenna-element spacings may be selected to cause respective unique grating lobe centers along a spatially discrete sampling spectrum, so as to facilitate differentiating lobe centers from side lobes, as shown in experiments relating to the present disclosure. In this context, each sparse linear arrays may have a different detectable amplitude due to associated grating lobe centers not coinciding and mitigating ambiguity among side lobes adjacent to the grating lobe centers. In certain more specific examples also consistent with such examples of the present disclosure, the grating lobe center of one such sparse linear array is coincident with a null of the grating lobe center of another of the sparse linear arrays, thereby helping to distinguish the grating lobe center and mitigate against ambiguous measurements and analyses.

In various more specific examples, the sparse array may include various numbers of such sparse linear arrays (e.g., two, three, several or more such sparse linear arrays). In each such example, there is a respective spacing value associated with each of the sparse linear arrays and collectively, these respective spacing values form a co-prime relationship. For example, in an example wherein the sparse array includes two sparse linear arrays, there are two corresponding spacing values that form a co-prime relationship which is a co-prime pair where there are only two sparse linear arrays.

In other specific examples, the present disclosure is directed to radar communication circuitry that operates with first and second (and, in some instances, more) uniform antenna arrays that are used together in a non-uniform arrangement, and with each such array being associated with a unique antenna-element spacing from among a set of unique co-prime antenna-element spacings that form a co-prime relationship (as in the case of a co-prime pair). The first uniform antenna array has transmitting antennas and receiving antennas in a first sparse arrangement, and the second uniform antenna array has transmitting antennas and receiving antennas in a different sparse arrangement. The radar communication circuitry operates with the first and second antenna arrays to transmit radar signals utilizing the transmitting antennas in the first and second arrays, and to receive reflections of the transmitted radar signals from an object utilizing the receiving antennas in the first and second arrays. Directional characteristics of the object relative to the antennas are determined by comparing the reflections received by the first array with the reflections received by the second array during a common time period. Such a time period may correspond to a particular instance in time (e.g., voltages concurrently measured at feed points of the receiving antennas), or a time period corresponding to multiple waveforms. The antennas may be spaced apart from one another within a vehicle with the radar communication circuitry being configured to ascertain the directional characteristics relative to the vehicle and the object as the vehicle is moving through a dynamic environment. An estimate of the DOA may be obtained and combined to determine an accurate DOA for multiple objects.

The reflections may be compared in a variety of manners. In some implementations in which a MIMO array design is used, a reflection detected by the first MIMO array that overlaps with a reflection detected by the second MIMO array is identified and used for determining DOA. Correspondingly, reflections detected by the first MIMO array that are offset in angle relative to reflections detected by the second MIMO array. The reflections may also be compared during respective instances in time; and used together to ascertain the directional characteristics of the object. Further, time averaging may be utilized to provide an averaged comparison over time (e.g., after spatial smoothing).

Figure 1B:
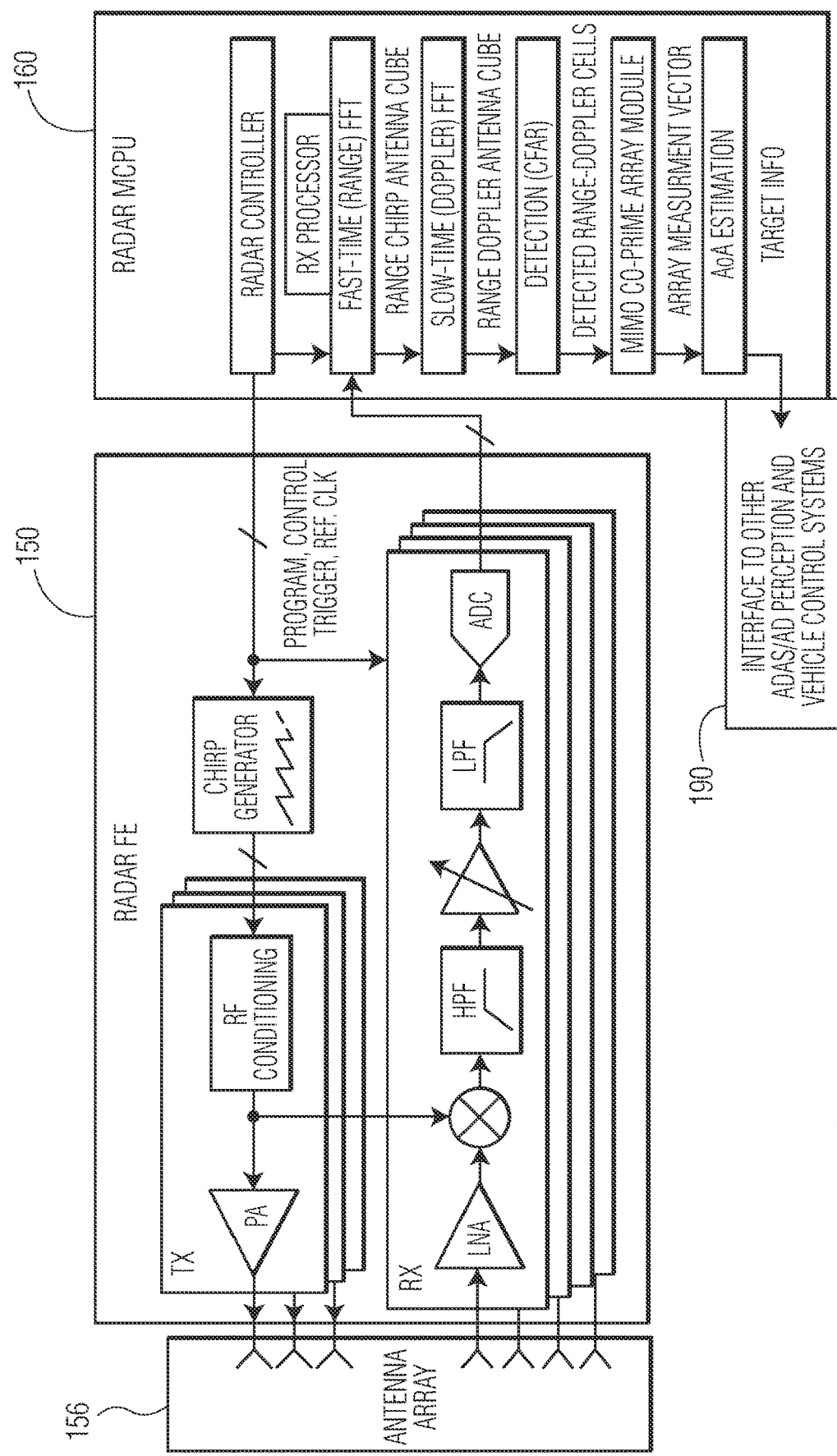
FIG. 1B is another system-level diagram of a more specific radar-based object detection circuit, in accordance with the present disclosure.

In accordance with the present disclosure, FIGS. 1A and 1B are block diagrams to illustrate examples of how such above-described aspects and circuitry may be implemented. Bearing in mind that aspects of the present disclosure are applicable to a variety of radar applications which may use sparse array and/or MIMO-based technology, and different modulation schemes and waveforms, FIG. 1A may be viewed as a generalized functional diagram of a Linear Frequency Modulation (LFM) automotive MIMO radar involving a radar-based detection transceiver having a radar circuit and a MIMO virtual array such as described in one of the examples above.

More specifically, in the example depicted in FIG. 1A, the radar circuit includes a front end 120 with signal transmission circuitry 122 to transmit radar signals and with signal reception circuitry 124 to receive, in response, reflection signals as reflections from objects (not shown). Antenna elements, as in the examples above, are depicted in block 126 via dotted lines as part of the front end 120 or as a separate portion of the radar device. Logic circuitry 130 may include CPU and/or control circuitry 132 for coordinating the signals to and from the front end circuitries 122 and 124, and may include a MIMO virtual array as part of module 134. In many examples, the MIMO virtual array provides an output that is used to estimate AoA information and, therefore, in this example, module 134 is depicted as having a MIMO virtual array and a detection/measurement aspect.

After processing via the MIMO virtual array via its sparse linear arrays (each with unique co-prime antenna-element spacing values), the module 134 may provide an output to circuitry/interface 140 for further processing. As an example, the circuitry/interface 140 may be configured with circuitry to provide data useful for generating high-resolution radar images as used by drive-scene perception processors for various purposes; these may include one or more of target detection, classification, tracking, fusion, semantic segmentation, path prediction and planning, and/or actuation control processes which are part of an advanced driver assistance system (ADAS), vehicle control, and autonomous driving (AD) system onboard a vehicle. In certain specific examples, the drive scene perception processors may be internal or external (as indicated with the dotted lines at 140) to the integrated radar system or circuit.

The example depicted in FIG. 1B shows a more specific type of implementation which is consistent with the example of FIG. 1A. Accordingly in FIG. 1B, the radar circuit includes a front end 150 with transmit and receive paths as with the example of FIG. 1A. The transmit path is depicted, as in the upper portion of FIG. 1B, with including a bus for carrying signals used to configure/program, to provide control information such as for triggering sending and sampling of send and receive signals and a reference clock signal which may be used to time-align (or synchronize) such activities between the transmit and receive paths of the front end 150. These signals are used to transmit radar signals, via a chirp generation circuit and RF (radio or radar frequency) conditioning-amplification circuits as are known in many radar communications systems. In the example of FIG. 1, multiple conditioning-amplification circuits are shown driving respectively arranged transmit antenna elements within an antenna array block 156. In certain contexts, the antenna array block 156 may be considered part of or separate from the front end 150.

The antenna array block 156 also has respectively arranged receive antenna elements for receiving reflections and presenting corresponding signals to respective amplifiers which provide outputs for subsequent front-end processing. As is conventional, this front-end processing may include mixing (summing or multiplying) with the respective outputs of the conditioning-amplification circuits, high-pass filtering, further amplification following by low-pass filtering and finally analog-to-digital conversion for presenting corresponding digital versions (e.g., samples) of the front end's processed analog signals to logic circuitry 160.

The logic circuitry 160 in this example is shown to include a radar controller for providing the above-discussed control/signal bus, and a receive-signal processing CPU or module including three to five functional submodules. In this particular example, the first three of these functional submodules as well as the last such submodule (which is an AoA estimation module as discussed with FIG. 1A) are may be conventional or implemented with other advancements. These first three submodules are: a fast-time FFT (fast-Fourier transform) block for generating object-range estimations and providing such estimations to a range-chirp antenna cube; a slow-time FFT block for Doppler estimations as stored in range—Doppler antenna cube; and a detection block which uses the previous block to generate data associated with objects detected as being in (range-Doppler) cells.

The fourth submodule in this example is a MIMO co-prime array module which, as discussed above, may be implemented using at least two MIMO-embedded sparse linear arrays, each being associated with one such unique antenna-element spacing, such as with values that manifest a co-prime relationship.

Figure 2:
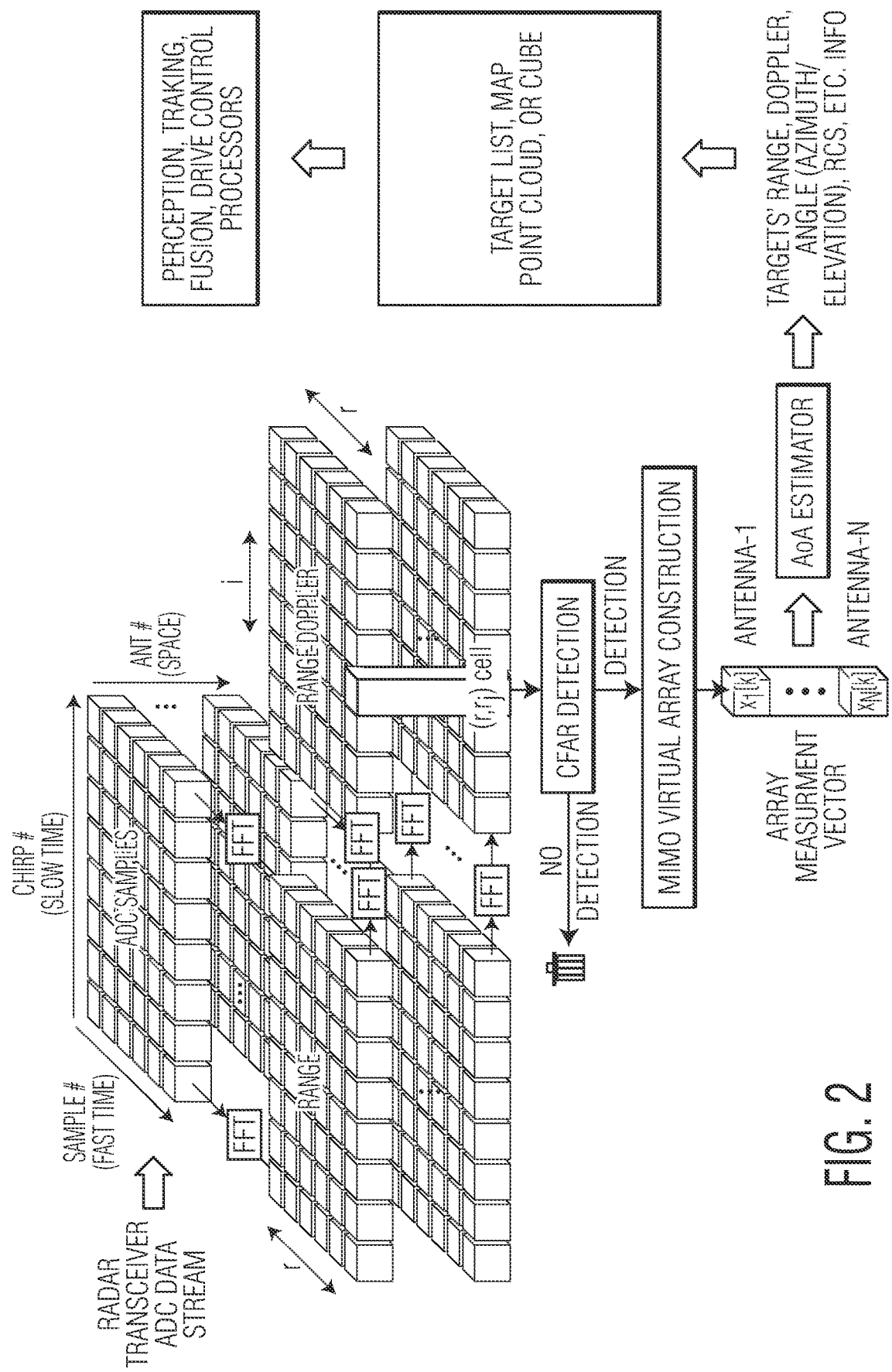
FIG. 2 is a signal-flow diagram illustrating an exemplary set of activities for a system of the type implemented in a manner consistent with FIGS. 1A, 1B and 2, in accordance with the present disclosure.

Consistent with the logic circuitry 160, FIG. 2 is a block diagram showing data flow for a LFM MIMO automotive radar receiver and specifically for the processing chain for data from the ADC data signal such as in FIG. 1B. Upon receiving the ADC sample stream from the radar transceiver, the chirp data is first processed for range spectrum using FFT accelerators, and the accumulated range-chirp map then processed over the chirp dimension with another FFT to produce Doppler spectrum and produces the produce Range Doppler map for each channel. Detection may use any of various implementations such as via a CFAR (adaptive constant false alarm rate) algorithm to detect the presence of targets in certain cells. For each detected range-Doppler cell, the MIMO virtual array may be constructed according to specific MIMO waveform processing requirements and may be used to produce an array measurement vector that is ready for AoA estimation processing. Such an AoA Estimator may then process the array measurement vector and produce target position information for use by subsequent circuits or systems (e.g., for data logging, display, and downstream perception, fusion, tracking, drive control processing).

An important aspect of the MIMO co-prime array module of the logic circuitry 160 concerns the suppression of spurious sidelobes as perceived in the spatial resolution spectrum in which the amplitudes of main lobes or "grating lobes" are sought to be distinguished and detected. Spurious sidelobes are suppressed by designing the MIMO co-prime array module as a composite array including at least two uniform linear arrays (ULA) with co-prime spacings. By using co-prime spacing, ambiguities caused by the sidelobes are naturally suppressed. The suppression grows stronger when the composite ULA is extended to larger sizes by adding additional MIMO-based transmitters via each additional ULA, as the suppression of spurious sidelobes may be limited by the size of the two composite ULAs. In the cases where higher suppression is desirable to achieve better target dynamic range, further processing may be implemented. In experimentation/simulation efforts leading to aspect of the present disclosure, comparisons of a 46-element uniform linear array (ULA) and a 16-element sparse array (SPA) of 46-element aperture has shown that the SPA and ULA have similar aperture parameters but the spatial under sampling of the SPA results in many ambiguous spurious sidelobes, and that further reducing the amplitudes of the spurious sidelobes results in a significant reduction of targets (or object) being falsely identified and/or located. In such a spatial resolution spectrum, the amplitude peaks in the spectrum corresponds to detected targets.

To further mitigate the spurious sidelobes, the sparsity constraint may be imposed upon the angular spectrum which leads to what is known as the L−1 Norm minimization problems. Well-known techniques such as Orthogonal Matching Pursuit (OMP) may be used for resolving the sparse angular spectrum; however, the performance is impacted by the sensitivity to array geometry and support selection, sensitivity to angle quantization, and/or the growing burden of least-squares (LS) computation as more targets are found. Alternatively and as a further aspect of the present disclosure, such performance may be improved by mitigating the angle quantization problem to a large degree through the use of a robust and highly-efficient fine-resolution binary search process following a coarse-grid FFT operation. Numerical efficiency and stability are further enhanced by avoiding the LS computational step.

Another exemplary aspect concerns the extendibility of such a MIMO co-prime sparse array. For MIMO radars, AoA estimation is based on the reconstructed MIMO virtual array's outputs. In a MIMO radar system, the equivalent position of a virtual antenna element can be obtained by summing the position vectors of the transmitting antenna and receiving antenna. As the result, the virtual array consists of repeating antenna position patterns of the Rx antenna array centered at the Tx antenna positions (or vice versa). Because of the array geometry repeating nature, for MIMO radar system, it is not possible to construct arbitrary sparse array pattern. With this limitation of reduced degrees of freedom, the sidelobe suppression becomes more difficult.

Optionally, the above-described MIMO array may be constructed to result in sidelobe suppression being repeatable (i.e., extendable via MIMO Tx) antenna geometry. The constructed MIMO virtual array consists of 2 embedded ULAs each with a unique element spacing. First, the two element spacing values are selected such that they co-prime numbers (that is, their greatest common factor (GCF) is 1 and their lowest common multiple (LCM) is their product). Secondly, the co-prime pair is selected such that the two composite ULA's results in an array of a (sparse) aperture of the size equal to the LCM and of antenna elements equal to the number of physical Rx antenna elements plus 1. If such array is found, the composite-ULA array can then be repeated at every LCM elements by placing the MIMO TX's LCM elements apart.

For example, for a system of 8 physical Rx antennas and 2 Tx MIMO antennas, a co-prime pair {4, 5} is selected to form the composite-ULA sparse array based on the following arrangement. This is shown in the table below:

```
Element position:           0       4   5       8   10  12      15  16      20
4-element spacing ULA:      x _ _ _ x _ _ _ x _ _ _ x _ _ _ x _ _ _ x
5-element spacing ULA:      x _ _ _ _ x _ _ _ _ x _ _ _ _ x _ _ _ _ x
{4, 5} Composite-ULA SPA:   o _ _ _ o o _ _ o _ o _ o _ _ o o _ _ _ o
Rx Element Index:           1       2 3       4   5   6       7 8       9
```

The LCM of {4, 5} co-prime numbers is 20, so, by placing MIMO Tx (transmit, as opposed to Rx for receive) antennas at {0, 20, 40, . . . } element positions (i.e. integer multiples of LCM), the two ULAs can be naturally extended to form a larger composite-ULA sparse array. This requires careful selection of the co-prime pair. The case of 2 Tx {4, 5} co-prime sparse array can be constructed based on the following arrangement, where the locations of the Tx antennas is marked with 'T' and the locations of the Rx antennas are marked with 'R'. The constructed MIMO virtual antennas' locations are marked with 'V'. The virtual array may consist of 2 embedded ULAs of 4 and 5 element spacings, both with the same (sparse array) aperture size of 36 elements, as below.

```
Position:  0 _ _ _ _ _ _ _ _ _ _ _ _ _ _ _ 16 _ _ _ 20 _ _ _ _ _ _ _ _ _ _ _ _ _ _ _ _ 36
Tx:        T _ _ _ _ _ _ _ _ _ _ _ _ _ _ _ _ _ _ _ T
Rx:        R _ _ _ R R _ _ R _ R _ R _ _ R R _ _ _ _
Virtual :  V _ _ _ V V _ _ V _ V _ V _ _ V V _ _ _ V _ _ _ V V _ _ V _ V _ V _ _ V V
```

Assuming half-wavelength element spacing, for a filled ULA the grating lobe occurs in the angle spectrum outside the +/−90° Field of view (FOV) so no ambiguity occurs. On the other hand, for the 4-element spacing ULA and the 5-element spacing ULA, grating lobe occurs within the +/−90° FOV causing ambiguous sidelobes. The use of co-prime element spacings, however, effectively reduces the amplitude level of the ambiguous sidelobes because the centers of the grating lobes of the two co-prime ULAs do not coincide until many repeats of the spatially discretely sampled spectrums. Because the centers of the grating lobes from the two ULAs do not overlap, the composite grating lobes have a lowered amplitude level due to the limited lobe width. Further, not only the centers of the grating lobes do not overlap, the center of the grating lobe of the first ULA coincide with a null of the second ULA such that it is guaranteed that the power from the two ULAs do not coherently add up in the composite array. This directly results in the suppression of the grating lobes in the composite array. As more MIMO Tx's are employed to extend the ULAs, the lobe width is further reduced such that the composite grating lobe levels are further reduced. Thus, aspects of the present disclosure teach use of a sparse MIMO array construction method that is sure to reduce the ambiguous sidelobes (or composite grating lobes of the co-prime ULAs) and the sidelobe suppression performance scales with the number of MIMO Tx's employed. Note that when more MIMO Tx's are employed, the overlap of the grating lobes further decreases. The co-prime pair guarantees a suppression level of roughly 50%. Additional suppression can be achieved by further incorporating additional co-prime ULA(s). For example, {3, 4, 5} are co-prime triplets which suppresses grating lobes to roughly 30% of its original level. {3, 4, 5, 7} are co-prime quadruplets which suppresses grating lobes to roughly 25% of its original level, etc. The percentage of suppression corresponds to the ratio of the number of elements of a co-prime ULA and the total number of elements in the composite array.

Figure 3A:
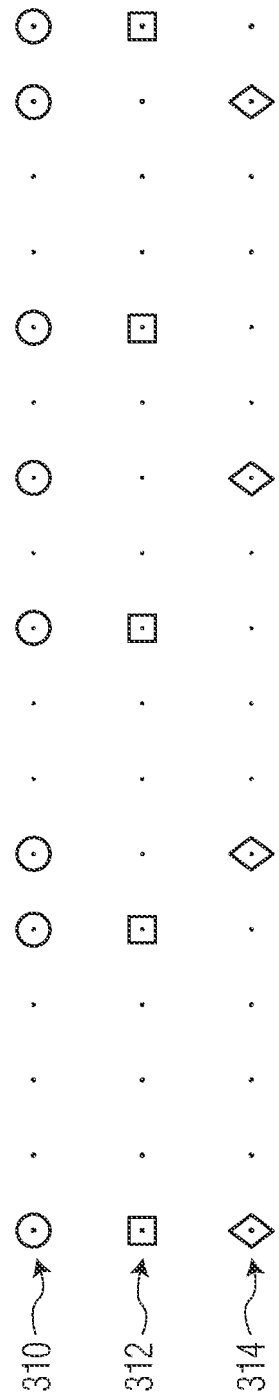
FIGS. 3A and 3B illustrate, respectively, a set of plots showing effective antenna spacings and a graph of normalized spatial frequency which may be associated with a system of the type implemented in a manner consistent with FIGS. 1A, 1B and/or 2 for illustrating aspects of the present disclosure in accordance with the present disclosure.
Figure 3A:
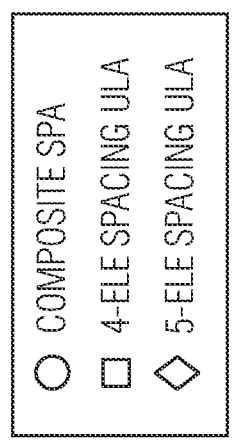
Figure 3B:
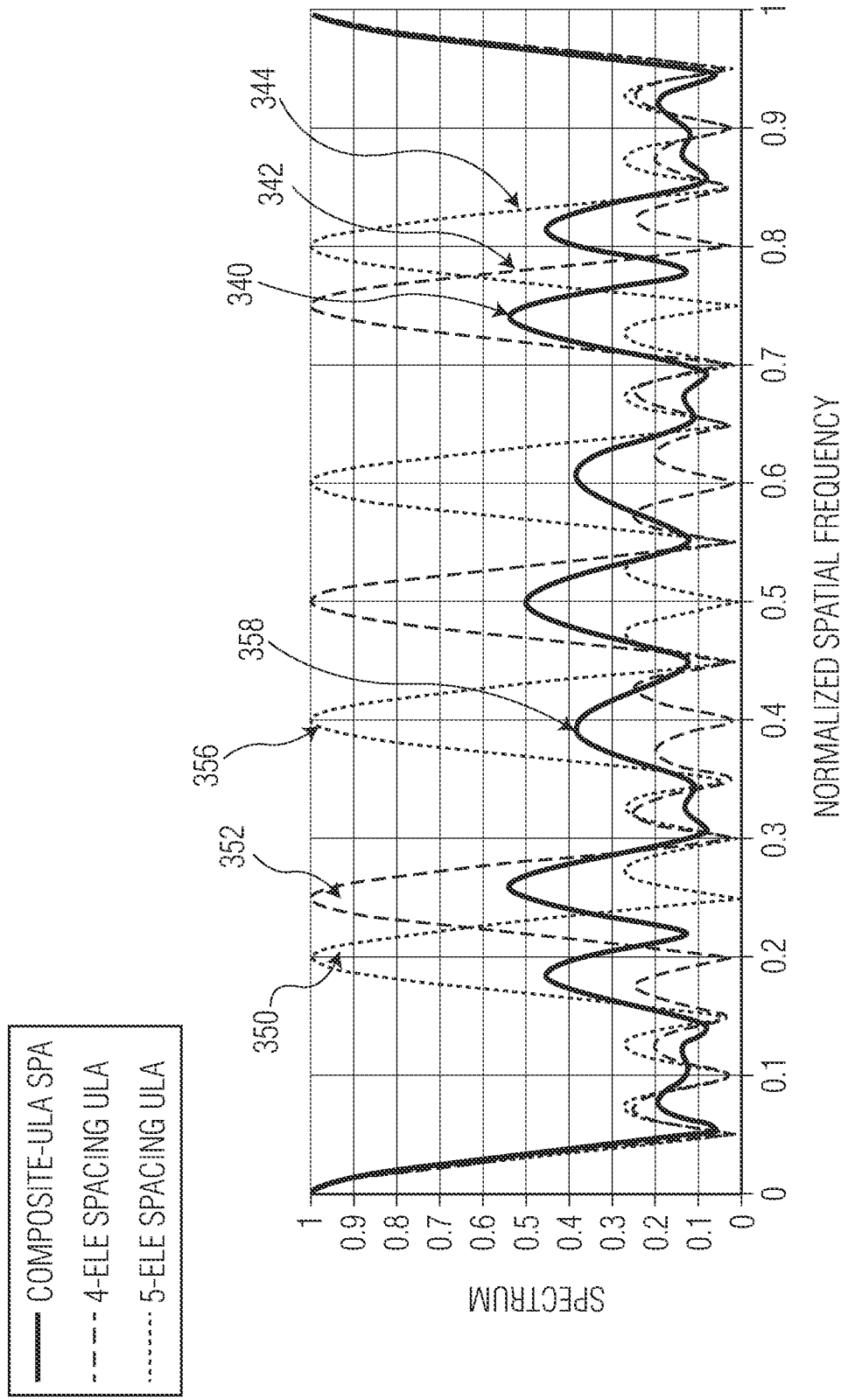
Figure 4A:
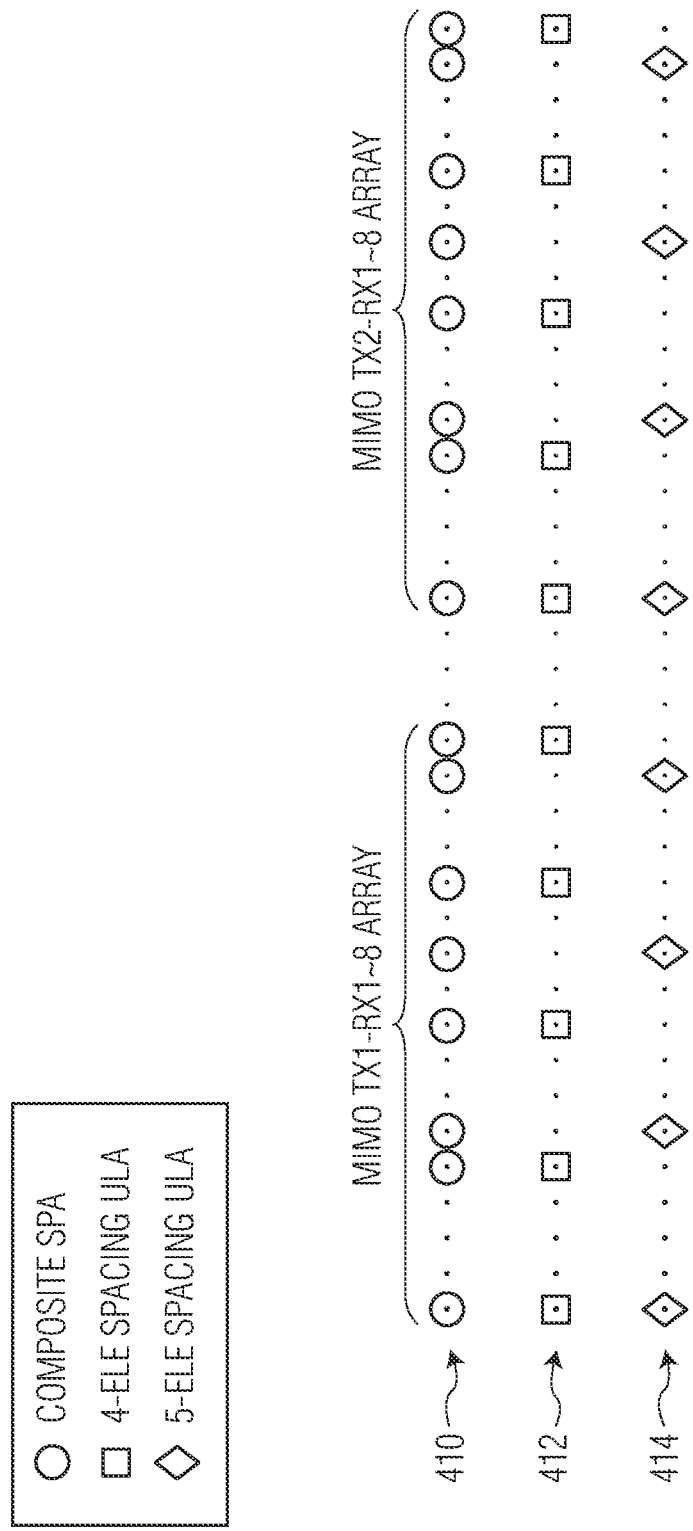
FIGS. 4A and 4B are respectively a different set of plots showing effective antenna spacings and a related graph of normalized spatial frequency, in accordance with the present disclosure.
Figure 4B:
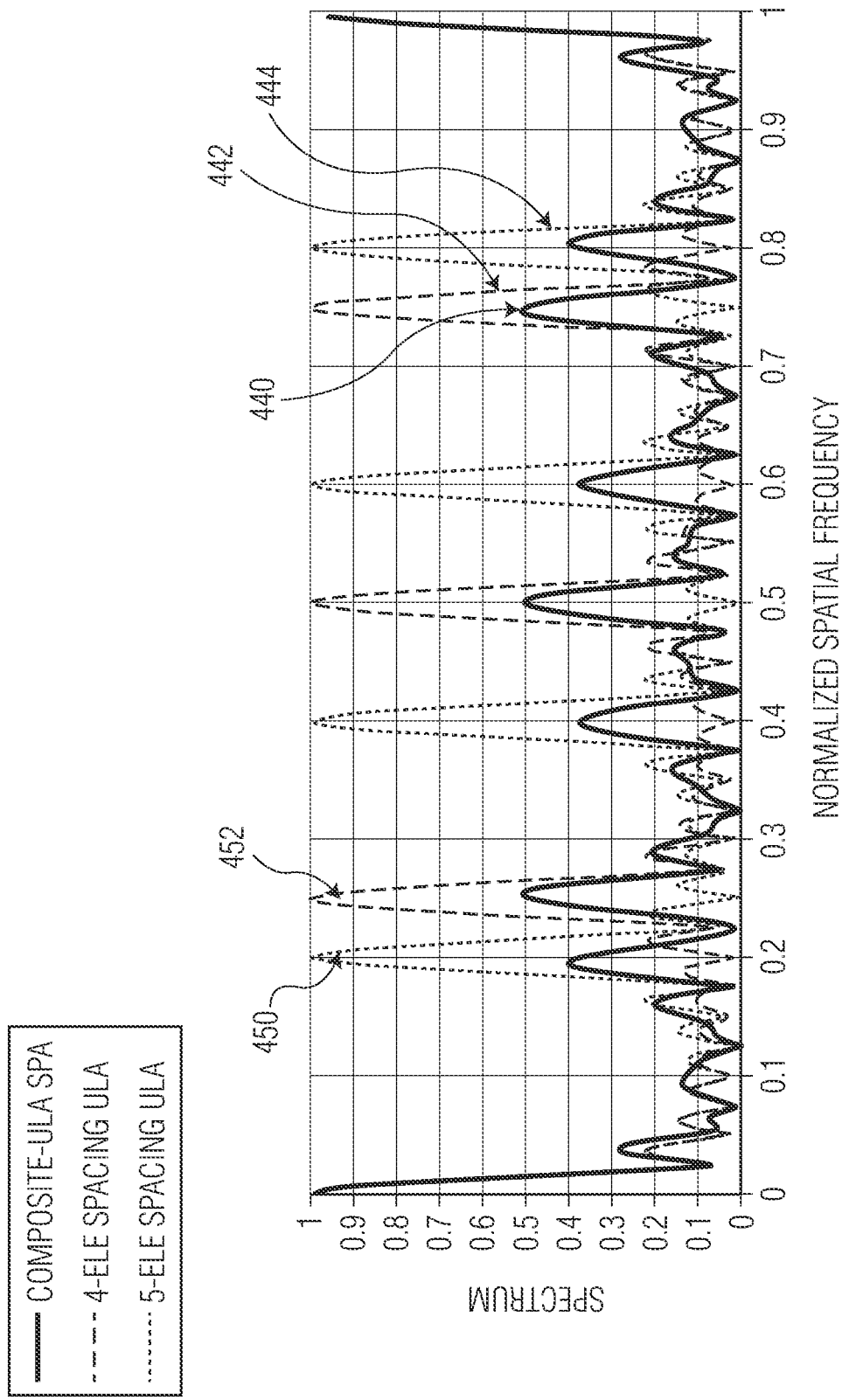

Further understanding of such aspects of the present disclosure may be understood by way of further specific (non-limiting) examples through which reference is again made to the spatial resolution spectrum but in these examples, with spatial frequency plots being normalized. These specific examples are shown in three pairs of figures identified as: FIGS. 3A and 3B; FIGS. 4A and 4B; and FIGS. 5A and 5B. For each pair of figures, the upper figure of the pair first shows the composite SPA with an effective random spacing as implemented by the following two or more ULA's for which the spacing values are based on the co-prime pairing or co-prime relationship as discussed above. The lower figure of the pair shows a plot of the relative measurements of the lobes positioned over a horizontal axis representing the normalized spatial frequency plots respectively corresponding to the composite SPA and its related ULA's with the noted spacings.

In FIGS. 3A and 3B, a {4, 5} co-prime sparse array of 8 elements is depicted. The composite SPA corresponds to spacing 310 and plot 340, and the two ULAs for which the antenna element spacing values are 4 (312) and 5 (314) are depicted as corresponding to plots 342 and 344. The co-prime ULA angle spectrums are illustrated in which the non-coincident grating lobes can be seen with partial overlap at 350 and 352 of FIG. 3B. It can also be observed that the grating lobes of one ULA coincides with nulls of the other ULA's (at 356 and 358 of FIG. 3B) showing significance of the sidelobe suppression effect. The resulting grating lobe in the composite array is about half of the origin amplitude.

FIGS. 4A and 4B illustrate a 2-Tx MIMO extended {4,5} co-prime sparse array which is used to produce a 16-element co-prime array. The 16-element co-prime array is realized using an extension of the co-prime ULAs by way of an additional MIMO (transmit array) as seen at the top of FIG. 4A. The composite SPA, having the additional MIMO, corresponds to spacing 410 and plot 440, and the two ULAs for which the antenna element spacing values are 4 (412) and 5 (414) are depicted as corresponding to plots 342 and 344. It can be seen that the grating lobe's beam width is halved (at 450 and 452) such that the amount of overlap is reduced. The resulting composite array angle spectrum not only has further suppressed grating lobes, but they are also more distinctly identifiable for resolving/mitigating false detections in connection with later sparse array processing steps.

Figure 5A:
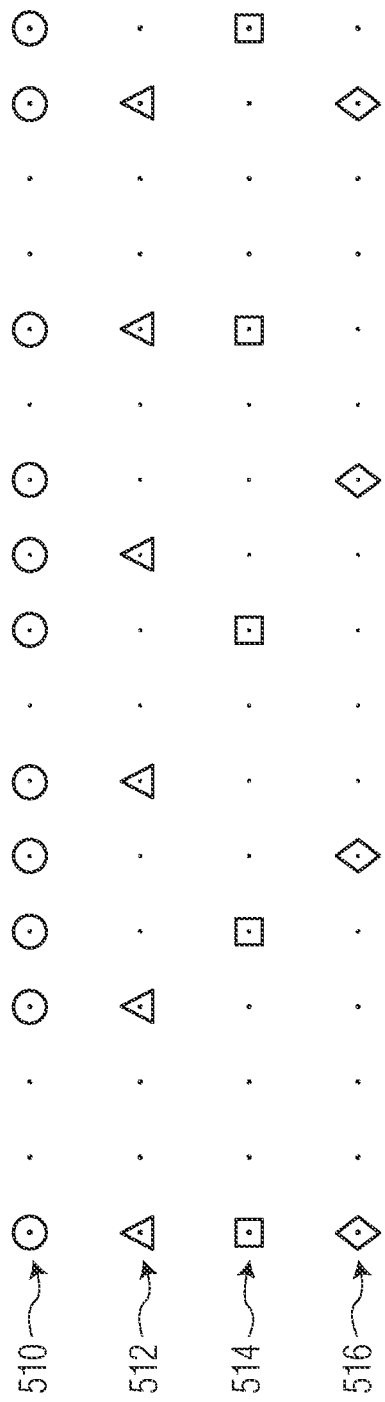
Figure 5B:
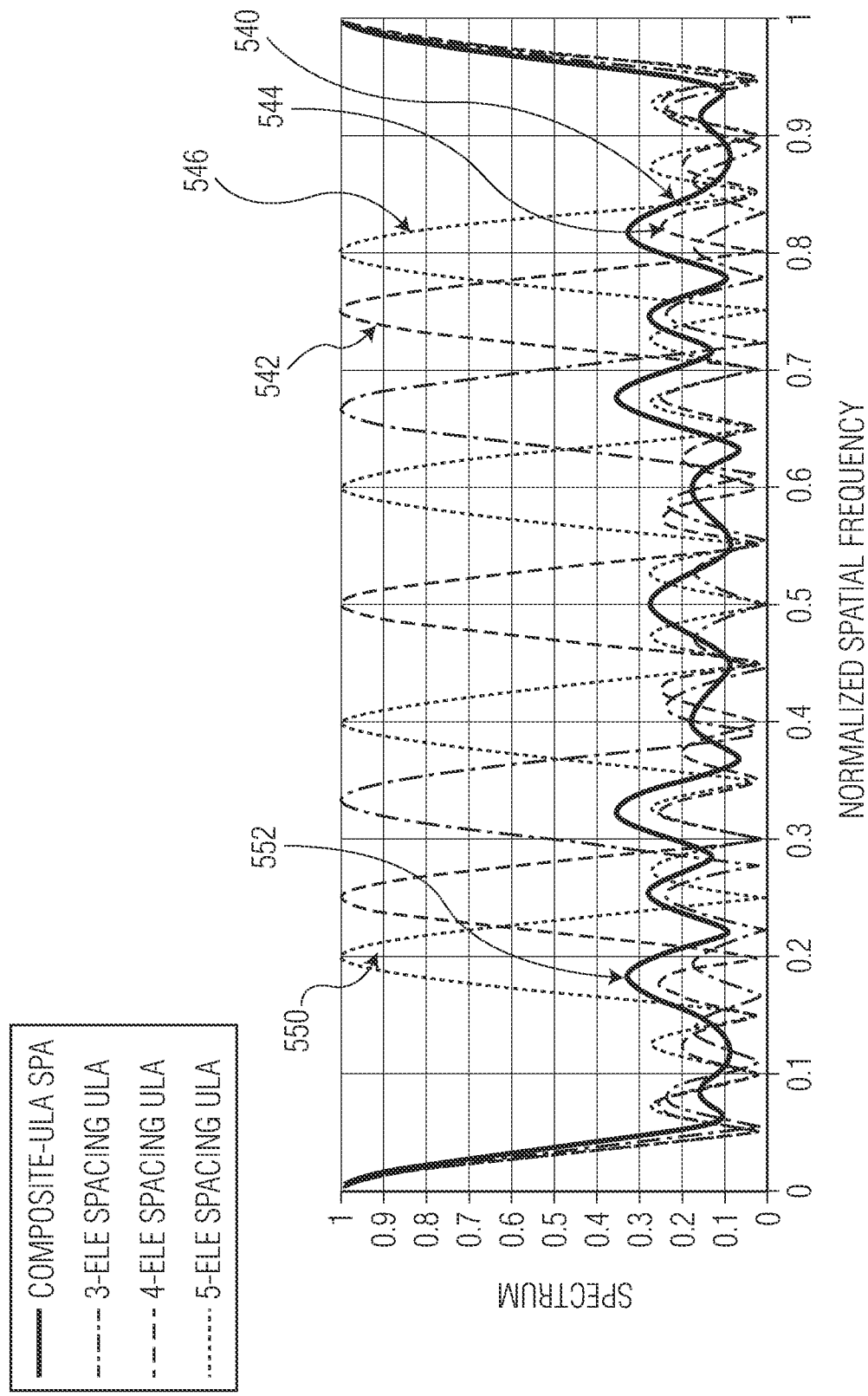

In FIGS. 5A and 5B, a {3, 4, 5} co-prime sparse array is illustrated which produces a 11-element co-prime array. It can be seen that the grating lobe's level is suppressed further (at 550 and 552) with this extension of a third sparse array. The composite SPA corresponds to spacing 510 and plot 540, and the three ULAs for which the antenna element spacing values are 3 (512), 4 (514) and 5 (516) are depicted as corresponding to plots 542, 544 and 546. The number of embedded sparse ULAs may include, for example, between three and six (or more) embedded sparse linear arrays In other examples, relative to the example of FIGS. 3A and 3B, the number of ULA' may be increased (as in FIGS. 5A and 5B) and the number of extension(s) may be increased (as in FIGS. 4A and 4B)

One may also compute individual co-prime ULA angle spectrums and detect angle-domain targets separately for each spectrum. In such an approach, only targets detected consistently in all co-prime ULA spectrums may be declared as being a valid target detection. In such an embodiment which is consistent with the present disclosure, the individual co-prime ULA's AoA spectrum are first produced and targets are identified as peaks above a predetermined threshold. Next, detected targets are check if they are present in the same angle bin in all co-prime ULAs' spectrums. If it is consistently detected in the same angle bin of all spectrums, a target is declared. Otherwise it is considered as a false detection and discarded.

In general, conventional processing for AoA estimation effectively corresponds to random spatial sampling and this leads to a sparse array design. It can be proven that the maximum spurious sidelobe level is proportional to the coherence so it follows that by designing a matrix A that has low coherence, this leads to low spurious sidelobes and vice versa. This demonstrates that by employing the extendable MIMO co-prime array approach of the present disclosure, reduced coherence can be achieved, and sparse recovery of targets can be obtained using greedy algorithms. In this context, such above-described MIMO array aspects are complemented by addressing the sparse spectral signal linear regression problem.

More specifically, to process the output of a sparse array, standard beamforming or Fourier spectral analysis based processing suffers due to the non-uniform spatial sampling which violates the Nyquist sampling rules. As a result, high spurious angle sidelobes will be present alone with the true target beams. To mitigate the spurious sidelobes, one may impose sparsity constraints on the angle spectrum outputs and solve the problem accordingly. One class of algorithms, based on so called greedy algorithms, originally developed for solving underdetermined linear problems, can be used for estimating the sparse spectrum output.

As is known the greedy algorithm starts by modelling the angle estimation problem as a linear regression problem, that is, by modelling the array output measurement vector x as a product of an array steering matrix A and a spatial frequency support amplitude vector c plus noise e, where each column of A is a steering vector of the array steered to a support spatial frequency $(f_1, f_1, \ldots f_M)$ in normalized unit (between 0 and 1) upon which one desires to evaluate the amplitude of a target and the spatial sampling positions $(t_1, t_1, \ldots t_N)$ in normalized integer units. To achieve high angular resolution, a large number of supports can be established, thereby dividing up the $0\sim 2\pi$ radian frequency spectrum resulting in a fine grid and a "wide" A matrix (that is, number of columns, which corresponds to the number of supports, is much greater than the number of rows, which corresponds to the number of array outputs or measurements). Since A is a wide matrix, this implies that the number of unknowns (vector c) is greater than the number of knowns (vector x) and the solving of equation x=Ac+e is an under-determined linear regression problem, where x and e are N×1 vectors, A is a N×M matrix, and c is a M×1 vector.

This is seen below as:

$$\begin{bmatrix} x_1 \\ \vdots \\ x_N \end{bmatrix} = \frac{1}{N} \begin{bmatrix} e^{j2\pi f_1 t_1} & e^{j2\pi f_2 t_1} & \ldots & e^{j2\pi f_{M-1} t_1} & e^{j2\pi f_M t_1} \\ e^{j2\pi f_1 t_2} & e^{j2\pi f_2 t_2} & \ldots & e^{j2\pi f_{M-1} t_2} & e^{j2\pi f_M t_2} \\ & & \vdots & & \\ e^{j2\pi f_1 t_N} & e^{j2\pi f_2 t_N} & \ldots & e^{j2\pi f_{M-1} t_N} & e^{j2\pi f_M t_N} \end{bmatrix} \begin{bmatrix} c_1 \\ c_2 \\ \vdots \\ c_{M-1} \\ c_M \end{bmatrix} + \begin{bmatrix} e_1 \\ \vdots \\ e_N \end{bmatrix}$$

Next, the greedy algorithm identifies one or more most probable supports and assuming one such most probable support, measures this support's most probable amplitude, and this is followed by cancellation of its contribution to the array output measurement vector to obtain a residual array measurement vector r. Based on the residual measurement vector, the process repeats until all supports are found or a stop criteria is met.

The identification of the most probably support (without loss of generality, assume one support is to be selected at a time) is by correlating the columns of A with measurement vector and support frequency that leads to the highest correlation is selected. The correlation vector, y, can be directly computed by $y=A^H x$ for the first iteration where $A^H$ denotes the transpose-conjugate (i.e. Hermitian transpose) of A. In general, for the k-th iteration, the correlation output is computed as $y=A^H r_k$ where $r_k$ is the residual measurement vector computed in the k−1-th iteration and $r_1$=x. The found support of the k-th iteration is then added to a solution support set $s \in \{i_1, i_2, \ldots i_k\}$.

The amplitude of the found support and the residual measurement vector can be obtained in any of various versatile ways. One known method, known as Matching Pursuit or MP, involves an iterative search through which the correlator peak's amplitude is found, and the amplitude is simply selected as the correlator peak's amplitude. Another known method, known as Orthogonal Matching Pursuit or OMP, in which a least-squares (LS) fitted solution is selected as the amplitude. The LS-fit is based on solving a new equation $x=A_s c_s$ in LS sense, where $A_s$ consists of columns of A of selected support set and elements of $c_s$ is a subset of elements of c of the selected supports. Once the amplitudes are found, the residual measurement vector is updated by $r_{k+1}=x-A_s \hat{c}_s$ where $\hat{c}_s$ is the LS solution of $c_s$. One solution to the LS problem is simply the pseudo inverse from which $\hat{c}_s$ is solved by $\hat{c}_s=(A_s^H A_s)^{-1} A_s x$ (for square or narrow matrix $A_s$) or $A_s^H (A_s A_s^H)^{-1} x$ (for wide matrix $A_s$).

The MP and OMP method can be used to reconstruct the sparse spectrum c if a certain property of A is met. One of such widely used property is Coherence, $\mu(A)$, defined by the equation $$\mu(A) = \max_{1 \leq i,j \leq M} \frac{|A_i^H A_j|}{\|A_i\|_2 \|A_j\|_2},$$

where $A_i$ and $A_j$ are the i-th and the j-th column of A, respectively and in theory, $$\mu(A) \geq \sqrt{\frac{M-N}{N(M-1)}}.$$

According to the known theory, unique sparse reconstruction is guaranteed if $$\mu(A) < \frac{1}{2K-1}$$

where K denotes the number detectable targets (i.e. number of supports with amplitude above noise level). So, the lower the Coherence, the large value of K is possible. Note that unique reconstruction is possible if such condition is not met, only that it cannot be guaranteed based on the known theory.

In order to achieve high angular resolution, many supports much more than the number of measurements (i.e. N<<KM) may be modelled and estimated. This naturally leads to very high Coherence which in turn results in small K or recoverable target amplitudes. One way to reduce the Coherence is by randomizing the spatial sampling of the steering vectors. For example, one may create a N'×1 steering vector where N'>N, and randomly (following any sub-Gaussian or Gaussian probability distribution) deleting the samples to obtain a N×1 vector. The resulting matrix is called Random Fourier matrix. In the following equation, the matrix A represents such a Random Fourier matrix where $\{t_1, t_2, \ldots, t_N\}$ are N integers randomly selected from $\{0, 1, \ldots, N'\}$.

$$x = Ac + e$$

$$\begin{bmatrix} x_1 \\ \vdots \\ x_N \end{bmatrix} = \frac{1}{N} \begin{bmatrix} e^{j2\pi f_1 t_1} & e^{j2\pi f_2 t_1} & \cdots & e^{j2\pi f_{M-1} t_1} & e^{j2\pi f_M t_1} \\ e^{j2\pi f_1 t_2} & e^{j2\pi f_2 t_2} & \cdots & e^{j2\pi f_{M-1} t_2} & e^{j2\pi f_M t_2} \\ & & \vdots & & \\ e^{j2\pi f_1 t_N} & e^{j2\pi f_2 t_N} & \cdots & e^{j2\pi f_{M-1} t_N} & e^{j2\pi f_M t_N} \end{bmatrix} \begin{bmatrix} c_1 \\ c_2 \\ \vdots \\ c_{M-1} \\ c_M \end{bmatrix} + \begin{bmatrix} e_1 \\ \vdots \\ e_N \end{bmatrix}$$

In general, the random spatial sampling requirement leads the sparse array design and it can be proven that the maximum spurious sidelobe level is proportional to the Coherence so by designing a matrix A that has low Coherence leads to low spurious sidelobes and vice versa. This demonstrates that by employing the extendable MIMO co-prime array approach of the present disclosure previously introduced, reduced Coherence can be achieved, and sparse recovery of targets can be obtained using greedy algorithms.

One problem with a greedy algorithm arises from the quantized supports on which target amplitudes are evaluated. Given finite quantization, which is necessary to keep coherence low, it is not possible to always have signals coincide exactly with the spatial frequency of the supports. When the actual spatial frequency misaligns with any of the supports, it is not possible to cancel the target signal in its entirety in the residual measurement vector and as a result, neighboring supports are to be selected in order to cancel the signal in the later iteration(s). As a result, the solution becomes non-sparse and the sparse recovery performance; thus, the resolution performance, is degraded.

According to another aspect of the present disclosure, the support quantization issue may be overcome or mitigated by adding a binary search step to the support selection process to obtain significant more accurate support efficiently. Following the standard correlation step in which a correlation peak is identified, the binary search is conducted to refine the coarsely found support spatial frequency that results in very low and negligible quantization error. For example, an L-level binary search, the support refinement process is conducted in L iterations. In the first iteration, two additional steering vectors are first constructed with spatial frequencies defined as the means spatial frequencies between the found support's and its two closest neighbors. More specifically for this non-limiting example, the second module in the earlier illustration may perform the steps via an L-level search in an iterative manner, wherein L is a positive integer greater than one, refinement of correlation for the output data is increased with each of the L levels, and collectively the L-level iterative search changes correlation for the output data by further refinement towards a factor of $2^L$ times.

Secondly the correlation of the two steering vectors with the residual measurement vector is computed and a new support is found as the one of the three (including the middle support) that has the highest correlation. And the second iteration continues now with the new middle support as the newly found maximum-correlation support and two additional steering vectors are constructed with the spatial frequencies being the means of its and its two closest neighbors. The process continues until the last layer is attempted. Once the final layer search is completed, the support resolution is improved by $2^L$ times. An L-layer binary search results in additional $2N2^L$ complex multiplications which is minimal compare to other alternative. For example, with conventional methods, to achieve the same small quantization error the number of support may be increased by $2^L$ times to $M2^L$ and the order of complexity, based on FFT, increases from $O\{M \log_2(M)\}$, to $O\{M2^L(L+\log_2(M))\}$, or equivalently $ML2^L+(ML2^L-1) \log_2(M)$ additional complex multiplications. Therefore, such aspects of the present disclosure can reach much higher accuracy or lower quantization error with much greater efficiency. This follows because ML>>2N.

Accordingly, in accordance with the present disclosure, such a binary (upper-lower type) search support refinement procedure may be applied to any of a variety of greedy algorithms to improve the performance for any of a variety of one-dimension or two-dimensional sparse array, not limited to the coprime MIMO sparse linear array of the present disclosure. In each instance, the logic (or processing) circuitry receives the output data (indicative of the reflection signals via a MIMO virtual sparse array in a form indicative of signal magnitude associated with the reflection signals, and then discerns angle-of-arrival information for the output data by performing certain steps including, for example, the following. First, the output data is correlated with at least one spatial frequency support vector which is indicative of a correlation peak for the output data. Next, the upper-side and lower-side support vectors, which are neighbors along the spatial frequency spectrum for said at least one spatial frequency support vector, are generated. Then, the logic or processing circuitry provides, via a correlation of the upper-side and lower-side support vectors and said at least one spatial frequency support vector, at least one new vector that is more refined along the spatial frequency spectrum for said at least one spatial frequency support vector. In many implementations these steps are carried out iteratively to provide refinement of previously identified support vectors, associated with each said at least one new vector, for reduction of quantization error and to keep coherence low;

however, in certain snapshot-like situations as would be expected with such a sparse recovery performance, such iterative performance is not necessarily required.

As an illustration in accordance with a specific example, the present disclosure includes FIG. 6 as a flow chart showing one example manner for implementing such an L-layer binary search support refinement procedure which may be used as a modification of a matching pursuit (or MP) method as described above but with FIG. 6 depicted in a more specific manner with more detail shown. These operations may be implemented, for example, by logic circuitry such as in the AoA-related module shown at the lower right of FIG. 1A and/or FIG. 1B.

Figure 6:
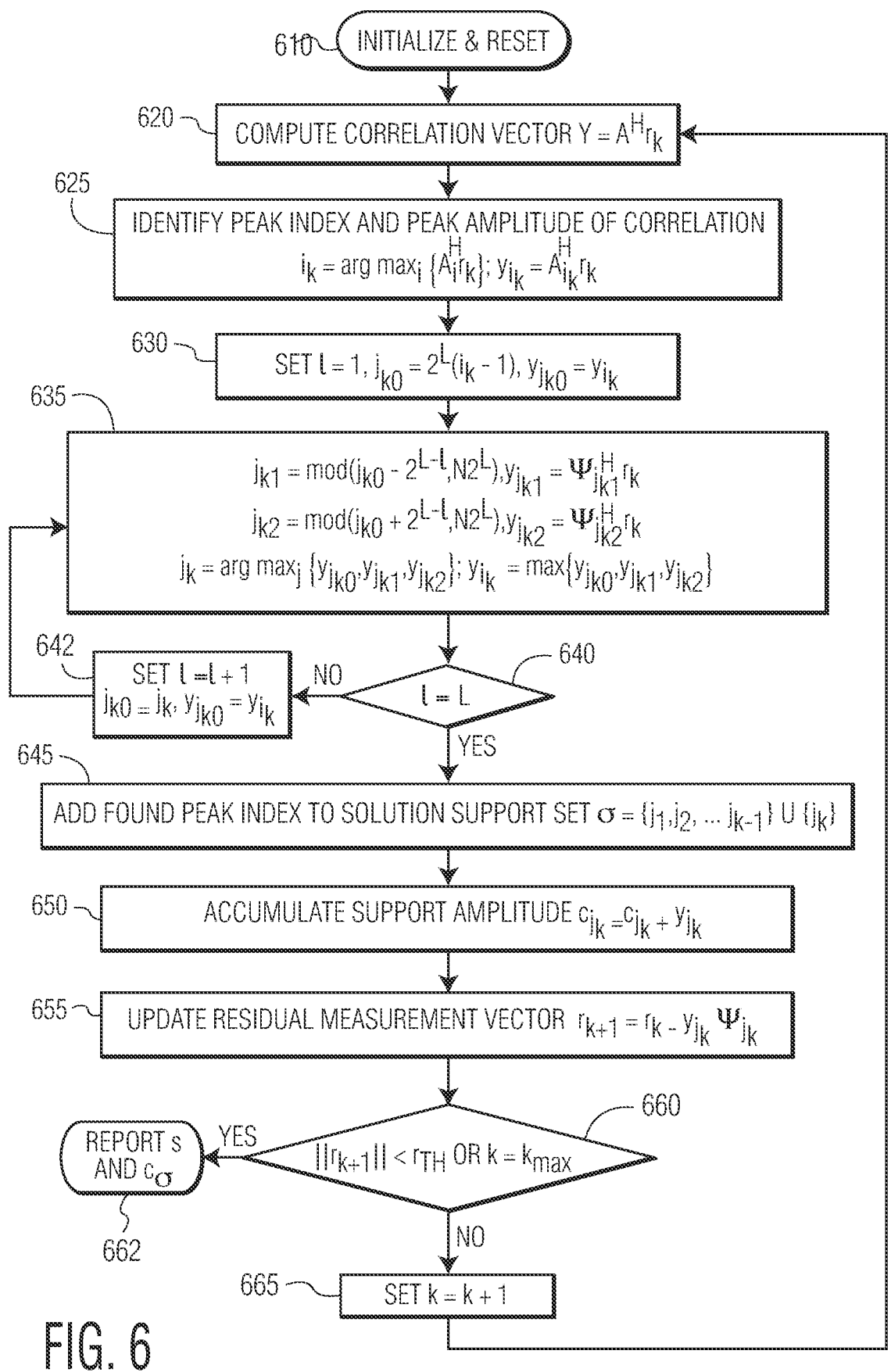
FIG. 6 is a flow chart showing one example manner in which certain more specific aspects of the present disclosure may be carried out.

For purposes of understanding some of the terminology, this flow in FIG. 6 pertains to an upsampled steering vector matrix $\Psi$ (of $M2^L$ supports) as defined with support indices $j \in \{1, 2, \ldots M2^L\}$ where index 0 is deemed the same as index $M2^L$ to comply with modulo-$M2^L$ operation. In practice, the entire $\Psi$ matrix need not to be precomputed and stored and can be generated on the fly on-demand when any particular support steering vector is benefited by the binary search. The matrix $\Psi$ may be mathematically characterized as a function of a vector x, with t and f respectively referring to the referenced time and frequency, as follows.

$$x = \Psi c + e$$

$$\begin{bmatrix} x_1 \\ \vdots \\ x_N \end{bmatrix} = \frac{1}{N} \begin{bmatrix} e^{j2\pi f_1 t_1} & e^{j2\pi f_2 t_1} & \ldots & e^{j2\pi f_{M2^L-1} t_1} & e^{j2\pi f_{M2^L} t_1} \\ e^{j2\pi f_1 t_2} & e^{j2\pi f_2 t_2} & \ldots & e^{j2\pi f_{M2^L-1} t_2} & e^{j2\pi f_{M2^L} t_2} \\ & & \vdots & & \\ e^{j2\pi f_1 t_N} & e^{j2\pi f_2 t_N} & \ldots & e^{j2\pi f_{M2^L-1} t_N} & e^{j2\pi f_{M2^L} t_N} \end{bmatrix} \begin{bmatrix} c_1 \\ c_2 \\ \vdots \\ c_{M2^L-1} \\ c_{M2^L} \text{ or } c_0 \end{bmatrix} + \begin{bmatrix} e_1 \\ \vdots \\ e_N \end{bmatrix}$$

The found (or resultant) upsampled fine-grid supports are collected in the support set $\sigma \subset \{j_1, j_2, \ldots j_k\}$ with corresponding amplitudes stored in $c_\sigma$. The search of new supports terminates when any of the stop criteria is met. An exemplary or typical stop criteria may include a maximum iteration count threshold ($k_{max}$) and a minimum residual threshold ($r_{TH}$).

At the top of FIG. 6, flow begins at block 610 with initialization of a reset support amplitude vector, c=0, a reset of a count parameter k set=1 (for up to k iterative computations towards refinement), and setting of residual measurement vector to measurement vector ($r_k=x$), and construction of a steering vector matrix A of N supports, and construction of an upscaled steering vector matrix $\Psi$ of $M2^L$ supports.

From block 610, flow proceeds to block 620 where correlation vector y is computed as $A^H r_k$.

From block 620, flow proceeds to block 625 where peak index and peak amplitude of correlation are identified, $i_k = \arg\max_i \{A^H r_k\}$; $y_{ik} = A^H_{ik} r_k$.

From block 625, flow proceeds to block 630 where the count of the lth layer of the L-layer binary search is initialized to 1.

From block 630, flow proceeds to block 635 where correlations of mid-supports to nearest neighbors are computed.

From block 635, flow proceeds to block 640 where a decision is made based on whether l=L. If l=L, flow proceeds from block 640 to block 645 where the logic circuit adds the found peak index to the solution support set $\sigma$ as indicated. At block 640, l≠L, flow proceeds to block 635 after setting l to l+1 as indicated in block 642.

From block 645, flow proceeds to block 650 where the logic circuit accumulates the support amplitude based on the above correlation.

From block 650, flow proceeds to block 655 where the residual measurement vector is updated, as indicated in block 650, for the next stage of the matrix-based computation.

From block 655, flow proceeds to block 660 where a decision is made based on whether the norm of $r_{k+1}$ is less than $r_{TH}$ or $k=k_{max}$, to assess whether the stop criteria is realized via the maximum iteration count threshold ($k_{max}$) or the minimum residual threshold ($r_{TH}$). If this condition is met, flow proceeds from block 660 to block 662 where the logic or computer circuitry reports, as an output, s and cσ; otherwise, flow proceeds from block 660 to block 665 where k is incremented and flow returns to block 610 for the next iteration. Note that alternative stop criteria may be used in place of or in addition to the norm of $r_{k+1}$ based check. For example, amount of change in the norm of $r_{k+1}$ may also be used to check if the iteration should terminate. In this case, if the change since the last iteration drops below a threshold, then the iteration may be stopped.

Terms to exemplify orientation, such as upper/lower, left/right, top/bottom and above and/or below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

As examples, the Specification describes and/or illustrates aspects useful for implementing the claimed disclosure by way of various circuits or circuitry which may be illustrated as or using terms such as blocks, modules, device, system, unit, controller, etc. and/or other circuit-type depictions. Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing such activities and/or steps associated with the above-discussed functionalities. In other examples, the logic circuitry may carry out a process or method by performing these same activities/ operations and in addition.

For example, in certain of the above-discussed embodiments, one or more modules are discrete logic circuits or programmable logic circuits configured and arranged for implementing these operations/activities, as may be carried out in the approaches shown in the signal/data flow of FIGS. 1A, 1B and 2. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first" type of structure, a "second" type of structure, where the adjectives "first" and "second" are not used to connote any description of the structure or to provide any substantive meaning; rather, such adjectives are merely used for English-language antecedence to differentiate one such similarly-named structure from another similarly-named structure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:
   a radar circuit to receive reflection signals, in response to transmitted radar signals, as reflections from objects; and
   computer processing circuitry with
      a first module to process data corresponding to the reflection signals via a sparse array and, in response, to generate output data indicative of signal magnitude associated with the reflection signals, and
      a second module to discern angle-of-arrival information for the output data by performing the following steps:
         correlating the output data with at least one spatial frequency support vector indicative of a correlation peak for the output data,
         generating upper-side and lower-side support vectors which are neighbors along a spatial frequency spectrum for said at least one spatial frequency support vector,
         providing, via correlation of the upper-side and lower-side support vectors and said at least one spatial frequency support vector, at least one new vector that is more refined along the spatial frequency spectrum for said at least one spatial frequency support vector.

2. The apparatus claim 1, wherein the sparse array is a multi-input multi-output virtual array which has at least one embedded uniform sparse linear array being associated with a unique antenna-element spacing and the steps are carried out iteratively to provide refinement of previously identified support vectors, associated with each said at least one new vector, for reduction of quantization error and to keep coherence low.

3. The apparatus claim 1, wherein the sparse array has at least two embedded uniform sparse linear arrays.

4. The apparatus claim 1, wherein the sparse array is characterized as not being a multi-input multi-output virtual array and as having at least two embedded uniform sparse linear arrays, each of which is being associated with a unique antenna-element spacing from among a set of unique co-prime antenna-element spacings.

5. The apparatus claim 1, wherein the second module is to perform the steps at least twice and in an iterative manner.

6. The apparatus claim 1, wherein the second module is to perform the steps via an L-level search in an iterative manner, wherein L is a positive integer greater than one, refinement of correlation for the output data is increased with each of the L levels, and collectively the L-level iterative search changes correlation for the output data by further refinement towards a factor of $2^L$ times.

7. The apparatus claim 1, wherein the first module and/or the second module is to impose sparsity constraints on the output data for mitigation of ambiguities due to spurious sidelobes, and the second module is to perform a greedy algorithm for estimating the correlation peak for the output data in the spatial frequency spectrum.

8. The apparatus claim 1, wherein the second module is to: model a range of sparsity constraints on the output data; and identify at least one likely related frequency-indicative support vector and an amplitude-indicative measurement vector that correlates with said at least one spatial frequency support vector.

9. The apparatus claim 8, wherein the second module is to identify the amplitude-indicative measurement vector by using a matching pursuit method.

10. The apparatus claim 8, wherein the second module is to identify the amplitude-indicative measurement vector by using a matching pursuit method that does not include using a set of a least-squares fitted step for selecting or obtaining the amplitude-indicative measurement vector.

11. The apparatus claim 1, wherein the first module and/or the second module is to impose sparsity constraints on the output data for maintaining a sparse recovery solution while the steps of correlating, generating and providing are to be performed by the second module.

12. The apparatus of claim 1, further including signal transmission circuitry to transmit the radar signals, signal reception circuitry to receive the reflection signals, a set of linearly-spaced set of antenna elements coupled to the signal transmission circuitry, and a set of linearly-spaced set of antenna elements coupled to the signal reception circuitry.

13. For use with a radar circuit having antenna elements and front-end transceiver circuitry to transmit radar signals and, in response, to receive reflection signals from objects, an apparatus comprising:
   logic circuitry including a first module, a second module and a memory circuit for hosting a sparse array;
   the first module to process data corresponding to the reflection signals via the sparse array and, in response, to generate output data indicative of signal magnitude associated with the reflection signals, and
   the second module to discern angle-of-arrival information for the output data by:
      correlating the output data with at least one spatial frequency support vector indicative of a correlation peak for the output data,
      generating upper-side and lower-side support vectors which are neighbors along a spatial frequency spectrum for said at least one spatial frequency support vector,
      providing, via correlation of the upper-side and lower-side support vectors and said at least one spatial frequency support vector, at least one new vector that is more refined along the spatial frequency spectrum for said at least one spatial frequency support vector, and
      refining the at least one new vector by performing one or more of the steps of correlating, generating and providing in an iteratively manner.

14. The apparatus of claim 13, wherein the sparse array is a multi-input multi-output coprime linear array.

15. For use in an apparatus which includes a radar circuit and computer processing circuitry, a method comprising:
   receiving, in response to transmitted radar signals, reflection signals as reflections from objects; and
   in the computer processing circuitry,
      processing data corresponding to the reflection signals via a sparse array,
      generating, in response, output data indicative of signal magnitude associated with the reflection signals, and
      discerning angle-of-arrival information for the output data by performing the following steps at least once:
         correlating the output data with at least one spatial frequency support vector indicative of a correlation peak for the output data,
         generating upper-side and lower-side support vectors which are neighbors along a spatial frequency spectrum for said at least one spatial frequency support vector, and
         providing, via a correlation of the upper-side and lower-side support vectors and said at least one spatial frequency support vector, at least one new vector that is more refined along the spatial frequency spectrum for said at least one spatial frequency support vector.

16. The method claim 15, wherein the steps are carried out iteratively to provide refinement of previously identified support vectors, associated with each said at least one new vector, for reduction of quantization error.

17. The method of claim 15, wherein the sparse array is a multi-input multi-output virtual array having at least one embedded uniform sparse linear array being associated with a unique antenna-element spacing.

18. The method of claim 17, wherein the multi-input multi-output virtual array has at least two embedded uniform sparse linear arrays, each of which is being associated with a unique antenna-element spacing from among a set of unique co-prime antenna-element spacings.

19. The method of claim 15, wherein the sparse array is not a multi-input multi-output virtual array.

* * * * *